(12) United States Patent
Goel et al.

(10) Patent No.: US 11,704,438 B2
(45) Date of Patent: *Jul. 18, 2023

(54) SYSTEMS AND METHOD OF CONTEXTUAL DATA MASKING FOR PRIVATE AND SECURE DATA LINKAGE

(71) Applicant: Collibra Belgium BV, Brussels (BE)

(72) Inventors: Satyender Goel, Chicago, IL (US); Upwan Chachra, Bothell, WA (US); James B. Cushman, II, Longboat Key, FL (US)

(73) Assignee: Collibra Belgium BV, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,848

(22) Filed: Jun. 21, 2022

(65) Prior Publication Data

US 2022/0318428 A1 Oct. 6, 2022

Related U.S. Application Data

(63) Continuation of application No. 16/776,293, filed on Jan. 29, 2020, now Pat. No. 11,366,928.

(51) Int. Cl.
*G06F 21/62* (2013.01)
*H04L 9/06* (2006.01)
*H04L 9/32* (2006.01)

(52) U.S. Cl.
CPC ...... *G06F 21/6245* (2013.01); *G06F 21/6227* (2013.01); *H04L 9/0643* (2013.01); *H04L 9/3213* (2013.01)

(58) Field of Classification Search
USPC ....................................................... 713/172
See application file for complete search history.

(56) References Cited

U.S. PATENT DOCUMENTS 8,843,997 B1 9/2014 Hare
9,998,435 B1 6/2018 Kothari et al.
(Continued)

FOREIGN PATENT DOCUMENTS

WO 2019183483 A2 9/2019

OTHER PUBLICATIONS

International Search Report and the Written Opinion of the International Searching Authority for PCT/IB2021/050740 dated Apr. 21, 2021, 13 pages.

*Primary Examiner* — Sanchit K Sarker
(74) *Attorney, Agent, or Firm* — Perkins Coie LLP

(57) ABSTRACT

The present disclosure relates to methods and systems for contextual data masking and registration. A data masking process may include classifying ingested data, processing the data, and tokenizing the data while maintaining security/privacy of the ingested data. The data masking process may include data configuration that comprises generating anonymized labels of the ingested data, validating an attribute of the ingested data, standardizing the attribute into a standardized format, and processing the data via one or more rules engines. One rules engine can include an address standardization that generates a list of standard addresses that can provide insights into columns of the ingested data without externally transmitting the client data. The masked data can be tokenized as part of the data masking process to securely maintain an impression of the ingested data and generate insights into the ingested data.

17 Claims, 8 Drawing Sheets

(56) References Cited

U.S. PATENT DOCUMENTS

| | | | |
|---|---|---|---|
| 10,873,592 B1* | 12/2020 | Singh | G06F 11/3476 |
| 11,245,706 B2* | 2/2022 | Kuperman | H04L 63/0884 |
| 2004/0107203 A1* | 6/2004 | Burdick | G06F 16/2365 |
| 2010/0211780 A1* | 8/2010 | Mukkara | H04L 63/1466 |
| | | | 713/168 |
| 2016/0275309 A1 | 9/2016 | Austin et al. | |
| 2016/0283735 A1* | 9/2016 | Wang | G06F 21/6254 |
| 2017/0366348 A1* | 12/2017 | Weimer | H04L 9/0838 |
| 2018/0278584 A1* | 9/2018 | Kuperman | G06F 21/33 |
| 2019/0139215 A1* | 5/2019 | Starr | G06F 18/2148 |
| 2019/0179888 A1 | 6/2019 | Saillet et al. | |
| 2019/0245693 A1* | 8/2019 | Iyer | G06Q 20/401 |
| 2019/0361932 A1* | 11/2019 | Hoffert | G06F 16/75 |
| 2021/0049396 A1 | 2/2021 | Radmer | |
| 2021/0105286 A1 | 4/2021 | Kuperman et al. | |
| 2021/0232701 A1 | 7/2021 | Goel et al. | |

\* cited by examiner

SYSTEMS AND METHOD OF CONTEXTUAL DATA MASKING FOR PRIVATE AND SECURE DATA LINKAGE

PRIORITY CLAIM

This patent application is a continuation of U.S. patent application Ser. No. 16/776,293, filed Jan. 29, 2020, entitled "SYSTEMS AND METHOD OF CONTEXTUAL DATA MASKING FOR PRIVATE AND SECURE DATA LINKAGE," the contents of which are herein incorporated by reference in its entirety.

TECHNICAL FIELD

This disclosure relates to data processing, and, in particular, to securely and privately processing data to derive insights into the data.

BACKGROUND

Various entities may maintain large volumes of data digitally on various computing devices. For example, an organization may maintain columns of data on a series of interconnected servers. It may be generally desirable to inspect these volumes of data to determine various insights into various characteristics of the data. However, retrieving and processing large volumes of data may be computational-resource intensive.

In many cases, client data may be transmitted from client computing devices to an external computing device for data inspection. However, client data can include sensitive/private information, such as client data that includes personally identifiable information (PII). In such a case, externally transmitting client data may leave this sensitive data vulnerable to unauthorized access. Accordingly, it may be desirable to identify characteristics of client data while limiting external access to the client data.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
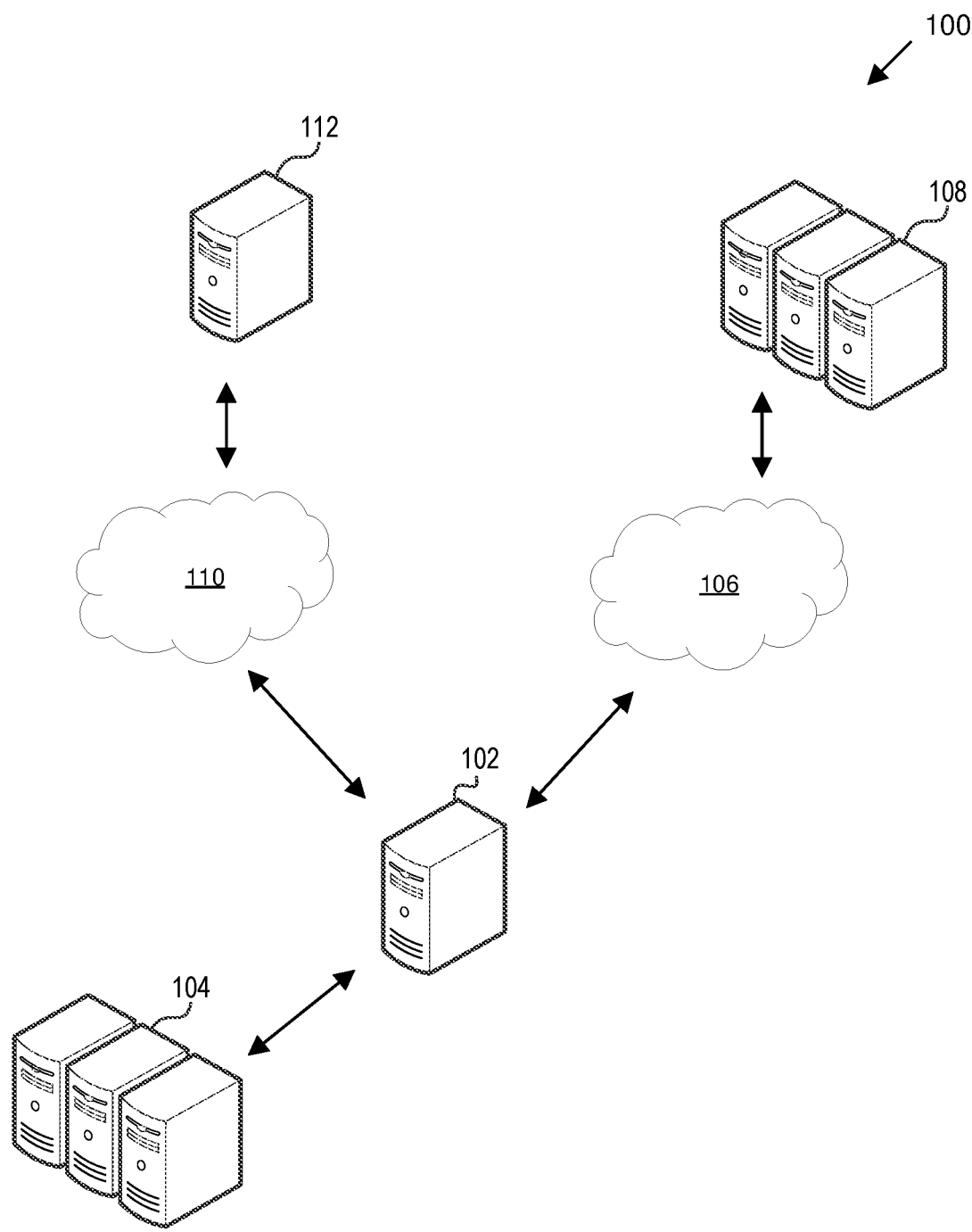
FIG. 1 is an example network architecture in which the present embodiments can be implemented.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Many entities (e.g., companies, organizations) maintain large volumes of data. This data can be stored in various registries or databases in computing devices. In many cases, these entities may need to identify and match records across disparate data sets as well as gain insights into the data sets. For example, an organization, in view of multiple similar data sets, may attempt to identify and select high quality and accurate datasets among the similar data sets.

However, in many instances, inspecting all data sets to detect insights can be computational-resource intensive. For example, retrieving and displaying multiple datasets can be an inefficient use of computational resources. Further, in many cases, these datasets may be sent to external devices for processing. However, when these datasets include sensitive data (e.g., data that includes personally identifiable information (PII)), transmitting such data to an external device may leave the data vulnerable to unauthorized access. Accordingly, entities may limit transmission/access of data from computing devices associated with the entities.

The present embodiments relate to contextual data masking that is performed with enhanced security to the underlying data. Particularly, a data anonymization process may classify ingested data that represents a type of data included in the underlying data, mask the data, and tokenize the data so as to securely maintain the data while maintaining data privacy/security.

The data can be classified by type, domain, sub-domain, business entity, data class, and/or data group level for ingesting data in a data masking process. During a data ingestion process, data masking and/or tokenization can occur based on an authorization of classifications for data. Data masking can be performed to tokenize data across registered data sources. The data masking process can be performed securely (e.g., by a node/application that is behind a firewall of a client network). Tokenized and contextually masked data can be stored in a network-accessible server system for asset matching. The stored data can be utilized in generating various insights into data quality while maintaining data security/privacy.

The data masking process may include automated review/inspection of client data at a client computing device. A private impression of the data can be generated that is anonymized and tokenized. The impression of the data can provide information relating to the client data without being traceable to the client data. A data masking can match datatypes using classes. Examples of classes can include a first name, address, phone number, date of birth, social security number, etc. However, any suitable type of classes can be associated with ingested data. Identifying the classes of data can be used in providing insights into data without transmitting source data to an external computing device.

The data masking process may include a data configuration process that can include generating anonymized labels of the classified data that can provide insights into the ingested metadata without the underlying data (e.g., data that includes personally identifiable information (PII)) being identifiable.

The data masking process can include validation of an attribute of the client data, standardizing the attribute into a standardized format, and processing the data via one or more rules engines.

The data processed in the data masking process can be tokenized and maintained by a network-accessible server system. Based on the tokenized data, insights into the underlying data can be generated without accessing/transmitting the underlying data itself. This can increase data privacy and security, as insights can be generated based on the data without sending the data to an external computing device over a network.

The data masking can allow for private and secure insights into the data to be generated. An example of an insight can include entity insights illustrating a duplication within a source system as well as overlap between sources overlap rate at a record level. Another example insight may include duplicate or multiple instances of data attributes within a domain and across domains, including a percentage overlap. As a further example, an insight can include a data quality reports from normalization and standardization (what percent is standard versus non-standard) or trends based on label processing (e.g., records with the same address).

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a computing device or a network-accessible server system) to examine data and process the data as described herein.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Environment Overview

FIG. 1 is an example network architecture 100 in which the present embodiments can be implemented. As shown in FIG. 1, the network architecture 100 can include a remote node 102. The remote node 102 can include a computing device that can communicate with both client devices and internal computing devices. For example, remote node 102 can communicate with a client node 104 and inspect client data stored at client node 104. In many cases, the remote node 102 can be allowed access to the client node 104 (e.g., remote node 102 is allowed behind a firewall implemented in a client network). As noted below, the remote node 102 can inspect client data maintained by client node 104 and generate classifications for the data to provide insights into the data without removing the underlying data from the client node 104.

The remote node 102 can perform various data extraction and processing tasks as described below. For example, the remote node 102 can map client data for data classification to identify appropriate classes of the client data. The classified portion of source data (e.g., a subset of client data) can be extracted by the remote node 102 for further processing. Further, the remote node 102 can perform any data masking processing task as described herein.

The remote node 102 can communicate with a network-accessible server system 108 via network 106. The network-accessible server system 108 can include one or more interconnected servers that can process and maintain data as described herein. In some embodiments, the network-accessible server system 108 can facilitate a cloud-based computing environment. In some instances, the remote node 102 can send de-identified client data and generated data classifications to the network-accessible server system 108. The network-accessible server system 108 can process the obtained data and perform further processing tasks as described herein. In some instances, network-accessible server system 108 can communicate various configuration parameters and user authentication information included in a configuration file generator to the remote node 102.

The remote node 102 can communicate with a secure server 112 via network 110. The secure server 112 can include a computing device (e.g., server, interconnected series of servers) with limited access to ensure security of secure data. The secure server 112 can provide seed and key information to the remote node 102. For example, the secure server 112 can maintain a hash code generator (e.g., SEED SHA 2 (512/256)) and/or client/source specific encryption keys (e.g., Advanced Encryption Standard key (AES 256)). The secure server 112 and remote node 102 can communicate information (e.g., seed and key information) via a hashed message authentication code (HMAC) layer or transport layer security (TLS) layer of network 110.

Data Masking Process Overview

As noted above, a data masking process can include classifying client data and generating an impression of the data (anonymized client data) and can be used to generate insights into the client data. In many cases, the client data can include personally identifiable information (PII) that can include information indicative of an individual or organization. Creating impressions of client data that includes PII or business sensitive data classes that anonymizes the client data can provide increased security and data privacy of the client data.

Figure 2:
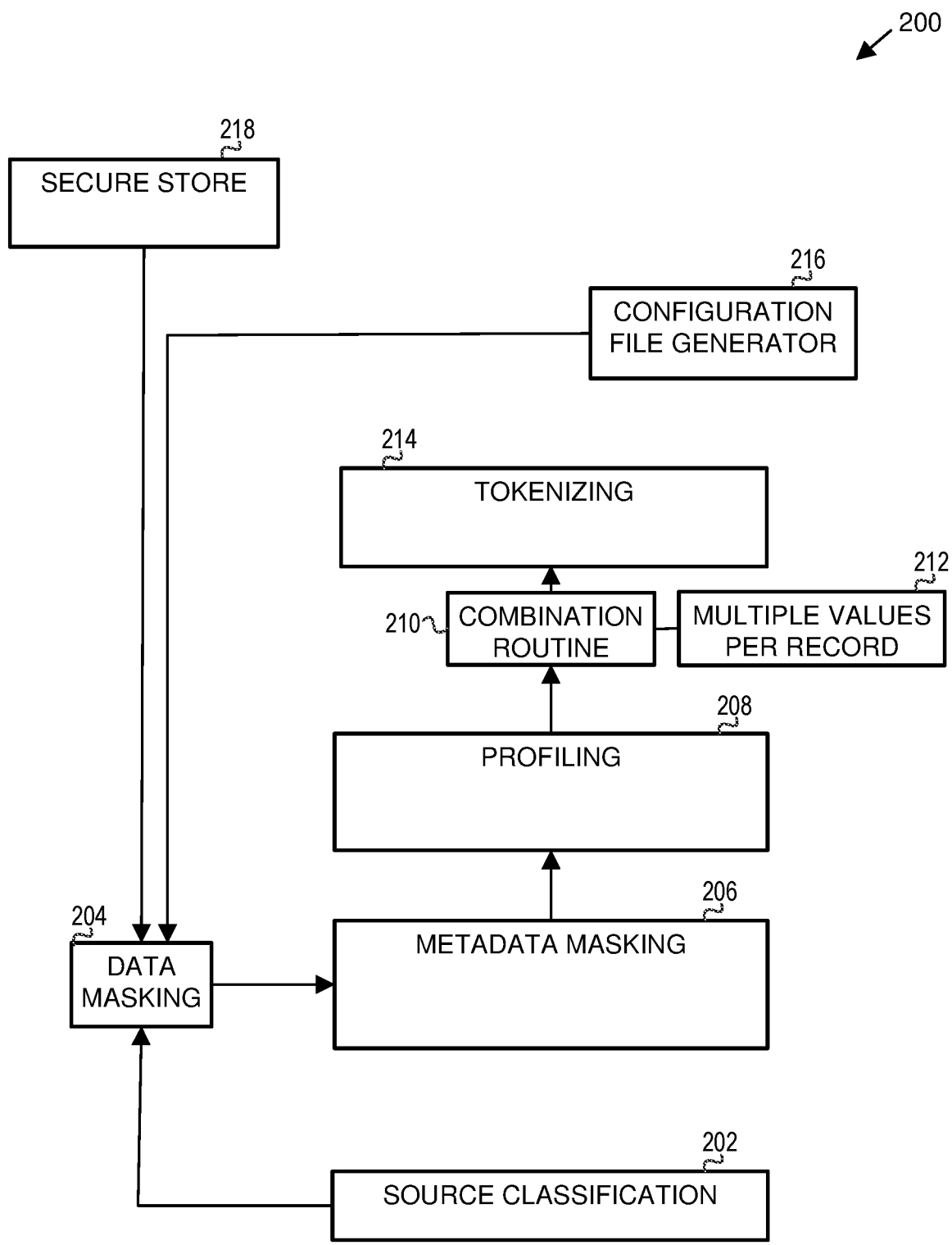
FIG. 2 is a block diagram illustrating an example data masking process.

FIG. 2 is a block diagram illustrating an example data masking process 200. Client data can be ingested and inspected to determine classification(s) for the client data. For example, multiple columns of data can be ingested/inspected by a secure computing device (e.g., remote node 102).

The client data can be catalogued/classified 202. Cataloging/classifying client data can include inspecting the client data and identifying the type(s) of information included in a dataset. Example classifiers can include a name, phone number, email address, birth date, credit card number, etc. In some instances, multiple classifications can be provided for a column of data or a dataset, where the multiple classifications can indicate that multiple types of data is included in the column of data or dataset.

The classifications for data can be forwarded on for data masking 204. In some instances, both the determined classifications for client data and a subset of client data (e.g., client data that does not include personally identifiable information) can be processed via a data masking process.

Data masking can include metadata masking 206. Metadata masking 206 can include inspecting the determined classifications for data and metadata relating to the data to generate label(s) that can anonymize the classifications and/or metadata. For example, if a classification for a column of data identifies "First Name" as a classification, a label "la1" can be generated for that classification. Accordingly, a label (e.g., label "la1") can only be indicative of a type of data to a device that can translate the label to a type of data included in the client data.

In many instances, a label can correspond to multiple attributes of data. For example, a label can include information that corresponds to a first name, last name, and a date of birth. Accordingly, a series of labels can correspond to any number of attributes and/or features of ingested data. The series of labels can be unique for each client and can include any combination of attributes and/or features of ingested data. Each label can provide masked insights into metadata associated with ingested data to provide further information relating to the ingested data while increasing privacy and/or security of the data. The labels can be utilized in de-identifying metadata of ingested data.

A series of labels corresponding to a client can be retrieved from configuration information associated with the client. The configuration information can be maintained at a network-accessible server system (e.g., network-accessible server system 108). The configuration information can provide the series of labels unique to the client and/or an address identifying a location of client-specific encryption information (e.g., encryption key, hash code information) maintained by a secure server. In some embodiments, any of the series of labels and the configuration file generator can be unique to a client.

Data masking can include processing data via a profiling process 208. Profiling the data can include several processing steps to optimize accuracy and efficiency of generated insights from processing masked data. Profiling data can include retrieving attributes of the client data. Examples of attributes can include any of the generated labels for client data, metadata for the client data, and de-identified client data.

The client data can be verified and standardized to generate a uniform set of information to be tokenized. For example, a name can be standardized to a common format where all alphabet characters are capitalized. In many cases, multiple rules engines can be utilized based on the data class.

In profiling data, the data can be processed in any of a combination routine engine 210 and a multiple value for record engine 212. The combination routine engine 210 can combine multiple labels/classifications for a dataset. In some instances, a label can correspond to a sub-portion of a class. For example, a label can be indicative of a related class or attribute.

The multiple values for record engine 212 can standardize datasets where there are multiple values for a record. For example, a person can include multiple addresses; a home address and a work address. These addresses can both be associated with the individual and standardized such that both addresses are identified as addresses.

The processed data can be tokenized 214. Tokenizing can include hashing the data to generate a tokenized version of the data. In some embodiments, the tokenized data can be encrypted using a client-specific encryption key to produce an intermedia encrypted token.

The encrypted token can be tagged with metadata to generate a contextualized token. The contextualized token can be generated by comparing the classification(s) for data with a configuration file generator 216 that maintains a listing of tags associated with each classification type. The configuration file generator 216 may provide various configuration information, such as source specific labels, the path to keys and hash for creating the contextualized token.

A hash key and encryption key can be maintained in a secure server store/s 218. The secure store 218 can include various security information, such as encryption keys, for example. The tokenized data can be maintained by network-accessible server system 108 for further processing.

Data Classification

Figure 3:
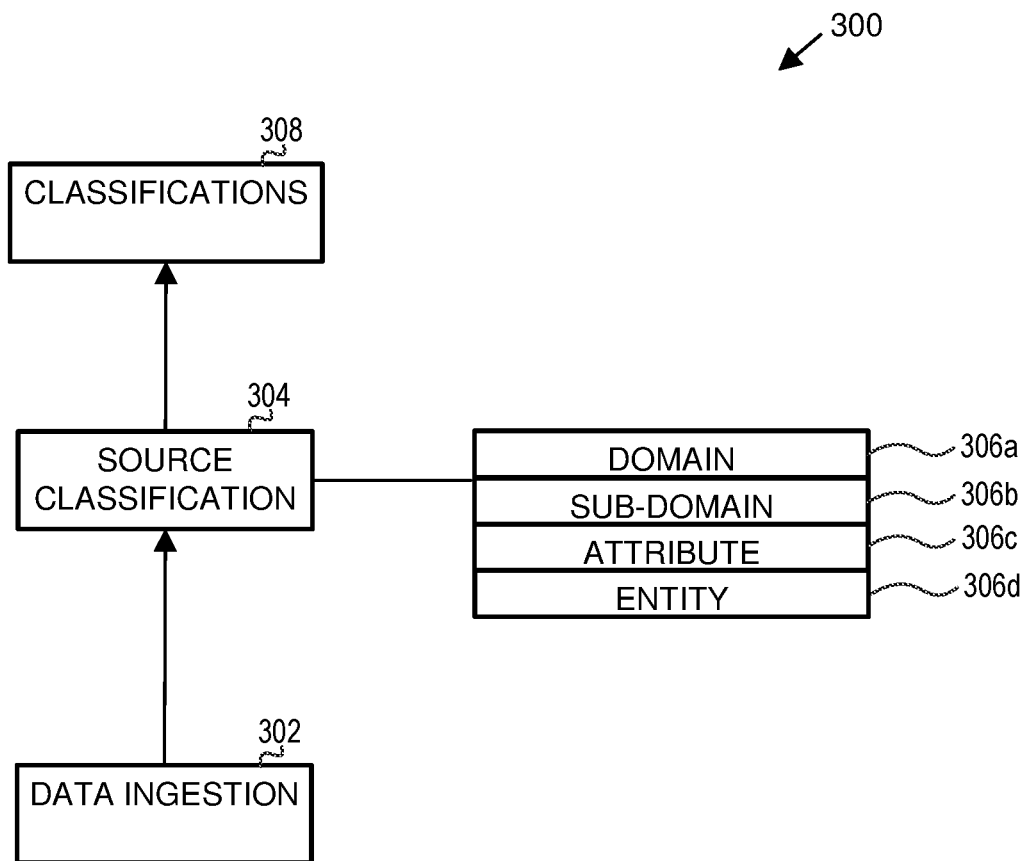
FIG. 3 is a block diagram illustrating an example data cataloging/classification process.

As noted above, client data can be ingested and inspected to generate classifications of the client data. FIG. 3 is a block diagram 300 illustrating an example data cataloging/classification process.

As shown in FIG. 3, data can be ingested 302. Ingesting data can include obtaining and/or inspecting client data from a client computing device (e.g., client node 104). For example, ingesting data can include inspecting a column of client data.

Ingesting client data can include identifying features of the client data. For example, a remote node can inspect client data to identify text/phrases of the client data, metadata of the client data, or any other features included in client data that can be used to generate classifications of the client data. In some embodiments, classification information can be retrieved from a client server or provided by the configuration file generator.

In some instances, ingested data can be catalogued/classified 304 to generate classifications 308 of the client data. For example, a classification for client data can be based on any of a domain 306*a*, subdomain 306*b*, attribute 306*c*, or entity classification 306*d*. The classifications associated with ingested data can provide context to the ingested data that can be utilized in generating insights into the ingested data.

A domain 306*a* can include a broader domain upon which a set of client data relates. For example, a domain classifier can include any of "people," "organization," "product," etc. As another example, a domain classifier can be indicative of whether the client data includes PII.

A subdomain 306*b* can include narrower domain upon which the client data is gathered. For example, the subdomain can include a client (e.g., an employer, a bank). For instance, client data can relate to an employer agreement for an employer included in the "people" domain. The client data can be inspected and determined that a subdomain classifier can identify the employer. As another example, the client data can be inspected to identify a type of form included in the client data.

An attribute 306*c* can be indicative of the type of data included in the client data. For example, an attribute 306*c* can include any of a name, phone number, email, social security number, credit card number, geographic location, language, etc., included in the client data.

An entity classification 306*d* can be indicative of a specific entity. For example, the entity classification 306*d* can be indicative of a specific client. As another example, if a bank has both personal accounts and mortgage accounts, an entity classification 306*d* can specify that the client data relates to mortgage accounts for the bank.

Metadata Processing

The data masking process may include metadata processing. Metadata processing can include processing obtained classifications and client data to generate labels that provide an anonymized representation of the information included in client data. In some cases, the labels and/or client data can be encrypted.

Figure 4:
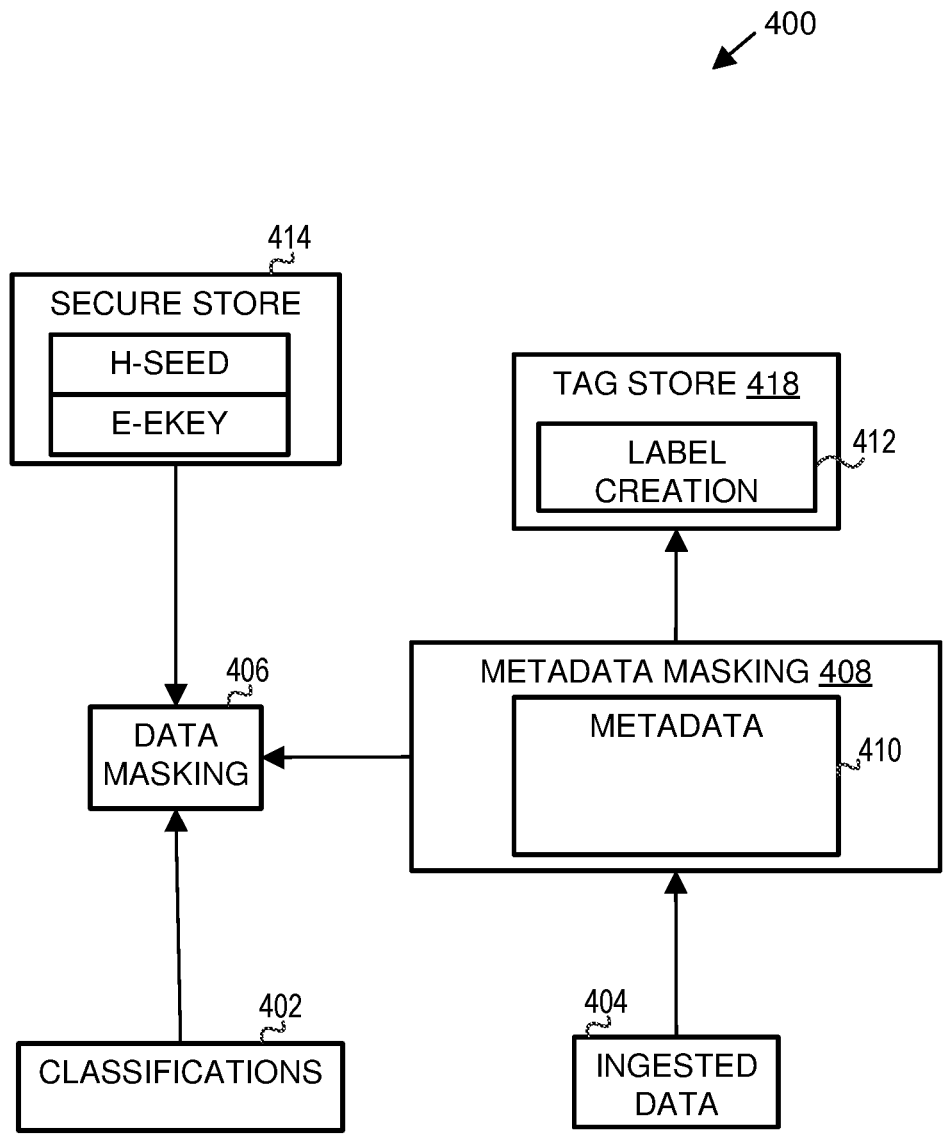
FIG. 4 is a block diagram illustrating an example process for metadata processing of data.

FIG. 4 is a block diagram 400 illustrating an example process for metadata processing of data. As shown in FIG. 4, data masking 406 can include obtaining any of the generated classifications 402 and/or the ingested client data 404. In some instances, data masking 406 can include acquiring client-specific configuration information (e.g., client-specific labels) to be provided to the client data. Further, data masking 406 can include acquiring client-specific encryption information and hashing information. For example, the encryption information can include a client-specific encryption key (e.g., E-EKEY). The hashing information can include a hash Salt (e.g., H-SALT). The hash SALT could be computer generated via SHA2 512/256, for example.

A tag store (or "configuration file generator") 418 can be utilized in label creation 412 to generate labels. A label can be a client-specific indicator of the type of information included in a subset of client data. The label may anonymize attributes of the client data that only can be translated using the client-specific configuration information. The label can be generated based on retrieving metadata 410 relating to the ingested data 404 and classifications 402 and performing a label creation process 412. The label creation process 412 can include comparing the input information with a client-specific label set to identify labels that correspond to the input information.

As an example, if a client uses the database field name "FirstName," corresponding the data class "first name," a corresponding label can include "La1." Using the client-specific configuration information, an authorized device (e.g., network-accessible server system 108) can translate the label La1 to identify that the client data relates to the data class "first name." Accordingly, in this example, unauthorized entities (e.g., entities without access to client-specific configuration information) would be unable to ascertain the type of information indicated by the label, as the labels are anonymized.

The generated labels can provide an impression of the client data that corresponds to various attributes of the client data. In some instances, a label can correspond to multiple attributes of client data. For example, a label can identify ingested data that includes a first attribute indicative of a "First Name" and a second attribute indicative of an "Address." In some embodiments, the series of labels can comprise a hierarchy of attributes. For example, a hierarchy of labels can include a subset of labels comprising a first tier of attributes, such as a name, address, etc. Furthering this example, the hierarchy of labels can include a second tier of attributes that further define the first tier of attributes, such as three letters of a name attribute and a Soundex of a name attribute.

Data Profiling

The data masking process may include data profiling. Data profiling may include several processing steps that modify input information to optimize matching accuracy for generating insights for the data. For example, data profiling can standardize and variate data before tokenizing profiled data.

Figure 5:
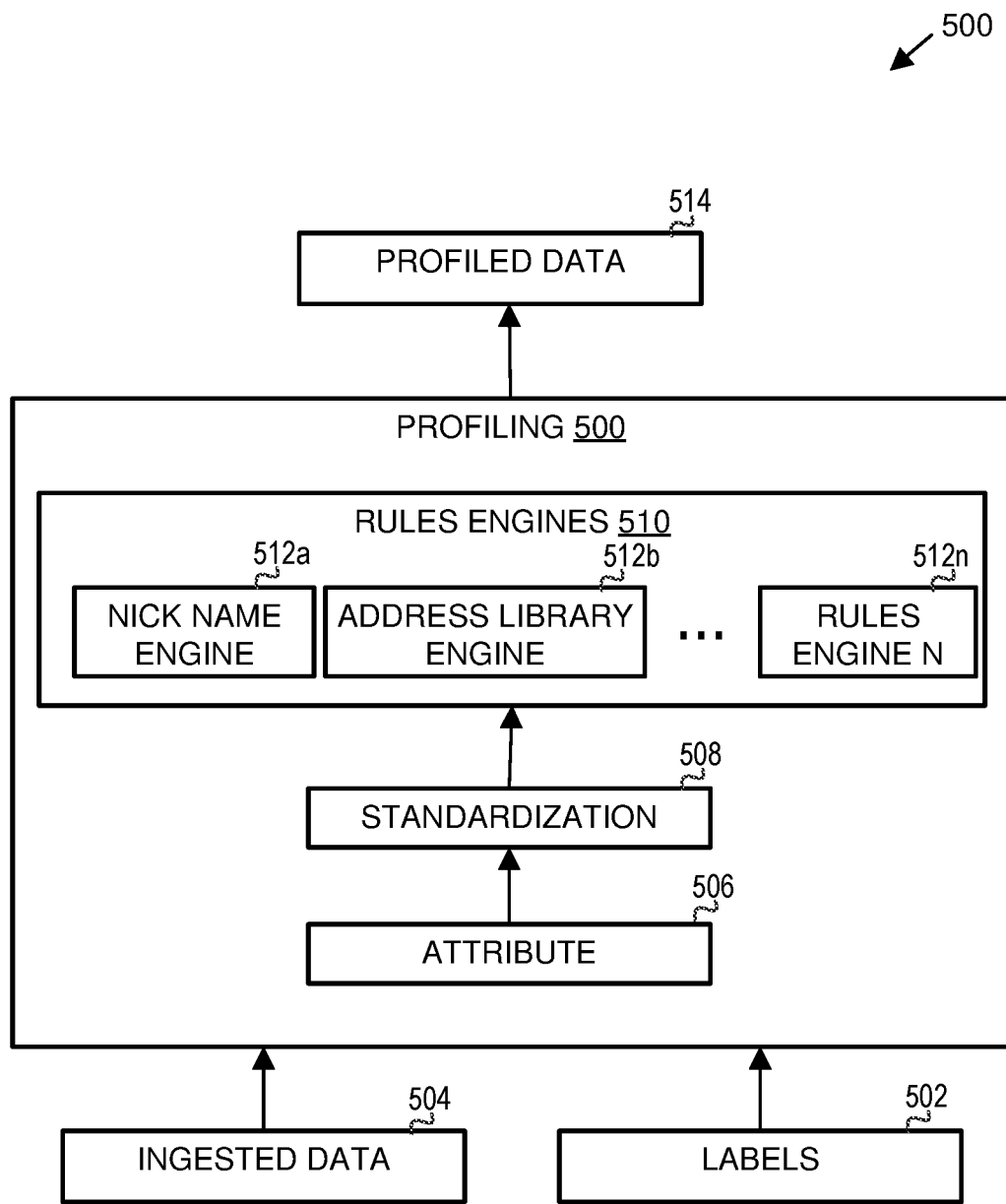
FIG. 5 is a block diagram illustrating an example data profiling process.

FIG. 5 is a block diagram 500 illustrating an example data profiling process. As shown in FIG. 5, data profiling 500 can include obtaining input information. Example input information can include generated labels 502 and/or ingested data 504. The ingested data 504 can include client data that is de-identified.

The data profiling 500 process can include defining attributes 506. An attribute 506 can be indicative of a characteristic or feature of the client data. For example, an attribute 506 can include a date of birth (e.g., Jan. 1, 1990). This can include a month date, day, year date, and/or a full date of birth (DOB). Other example attributes 506 can include an address, name, email address, gender, phone number, social security number, etc. An attribute 506 can also include a label/classification that is indicative of client data.

Data profiling 500 can include standardization 508 of the attributes 506. Standardization 508 can include verification of the data included in the attributes 506 corresponds to the attribute and standardizing a format of the attribute 506 to a uniform format. Data profiling 500 can include multiple standardization processes that can standardize various types of attributes. In many cases, standardization can be modular horizontally and/or vertically.

The standardized attributes can be processed via one or more rules engines 510. A rules engine can further process a standardized attribute that allows for more insights to be derived from the standardized attribute. Example rules engines 510 can include a nick name engine 512a, address library engine 512b, or any other number of rules engines (e.g., rule engine N 512n).

A nickname engine 512 can associate related names with a common identifier. For example, the name Rick is a common nick name for the name Richard. The nick name engine 512 can inspect an attribute to determine if a name has common nick names associated with the name. For example, the nick name engine 512a can identify that the name Richard has a common nick name of Rick. In such an instance, the nick name engine 512a can create a subsequent label or impression of the attribute that identifies the nick name. The profiled data 514 can include a secondary impression that is indicative of common nick names. This secondary impression can be indicative of any attribute or combination of attributes.

An address library engine 512b can include identifying whether an attribute includes an address and adding the address to a repository/listing that includes various addresses. The address library engine 512b can associate an address to a client/entity. Upon processing via the rules engine(s) 510, data profiling can output profiled data 514.

In some embodiments, an example method for masking data may include ingesting a stream of data corresponding to a client. The stream of data corresponding the client may include one or more columns of client data. As noted above, the data masking process may create an impression of the data that is anonymized with any PII removed such that client data is not exposed external to the client server.

In some embodiments, the stream of data can include one or more classifiers indicative of a characteristic of the attribute. The characteristic can be utilized in identifying the first label. The classifier may include any of a domain classifier indicative of a type of information included in the stream of data, a subdomain classifier indicative of a subset of the selected information type identified in the domain classifier, an attribute classifier indicative of a type of identifiable information included in the stream of data, and an entity classifier indicative of a division of an organization associated with the client.

The method may include identifying an attribute from the stream of data. The attribute may include an impression of a portion of data included in the stream of data that prevents transmission of information included in the stream of data from a client node maintaining the stream of data. In some embodiments, the attribute may include data with any PII removed such that the security/privacy of client data is maintained.

The method may include retrieving client-specific configuration information that includes a listing of labels. Each label in the listing of labels can provide a client-specific indication of a type of information included in the dataset. The labels can be anonymized such that only authorized entities with access to the client-specific configuration information can identify the information indicated by the labels.

The method may include identifying a first label included in the listing of labels that corresponds to a type of information in the attribute. For example, if the attribute is a date of birth, the first label can be indicative of a date of birth.

The method may include processing the attribute and the first label via a data profiling process. The data profiling process may include retrieving a set of validation rules and a set of standardization rules that correspond to the first label. The set of validation rules can provide rules indicative of whether the attribute corresponds to the label. The set of standardization rules may provide rules to modify the attribute into the standardized format.

The data profiling process may include comparing the attribute with the set of validation rules to determine whether the attribute corresponds to the label. If it is determined that the attribute corresponds to the label, the attribute can be modified, as noted below.

In other embodiments, the method may include determining that the attribute is not in accordance with the series of validation rules that correspond to the first label. In these embodiments, responsive to determining that the attribute is not in accordance with the series of validation rules, the first label may be disassociated from the attribute. A second label that is different than the first label may be identified, and the attribute may be validated by determining that the attribute is in accordance with a second series of validation rules that correspond to the second label.

The data profiling process may include modifying the attribute into a standardized format according to the set of standardization rules. This may be performed responsive to determining that the attribute corresponds to the first label.

The data profiling process may include processing the attribute through multiple rules engines. The rules engines may include a name engine that associates the attribute with commonly associated names included in a listing of associated names, responsive to determining that the attribute is indicative of a name. The rules engines may also include an address library engine that adds the attribute to a library of addresses associated with the client, responsive to determining that the attribute is indicative of an address.

In some embodiments, the method may include retrieving a set of client-specific encryption information from a secure server. The client-specific encryption information may include a hash salt specific to the client and an encryption key specific to the client. The attribute may be hashed using the hash salt to generate a hashed attribute. The hashed attribute may be encrypted using the encryption key. In some embodiments, the first label may be compared with a tag store including a series of client-specific tags to identify a first tag that corresponds to the first label. A contextualized token may be generated that includes the hashed attribute and the first tag. In these embodiments, the contextualized token can be sent to the network-accessible server system.

In some embodiments, the client-specific encryption information may be encrypted using a hashed message authentication code (HMAC) protocol or transmitted through TLS mechanism, and the hash code may include a computer-generated SHA2 512/256 token.

In some embodiments, the method may include identifying multiple labels included in the listing of labels. The multiple labels may represent multiple types of information included in the attribute. Responsive to determining that the attribute is associated with more than one label, the multiple labels may be combined into a combination label that identifies the multiple types of information included in the attribute via a combination routine.

In some embodiments, the method may include determining that the first label matches a previously-identified label for a previously-identified attribute in the stream of data corresponding to the client. The method may also include combining the first label with the previously-identified label such that both the previously-identified attribute and the attribute correspond to the previously-identified label.

The method may include outputting the processed attribute and first label to a network-accessible server system. The network-accessible server system may maintain a series of processed attributes or tokens relating to the masked data and generate insights into the client data.

Data Tokenizing

The data masking process may include a tokenizing process. Tokenizing can include encoding profiled data such that the data can be stored and inspected to generate insights into client data. Tokenizing data can provide additional security of client data.

Figure 6:
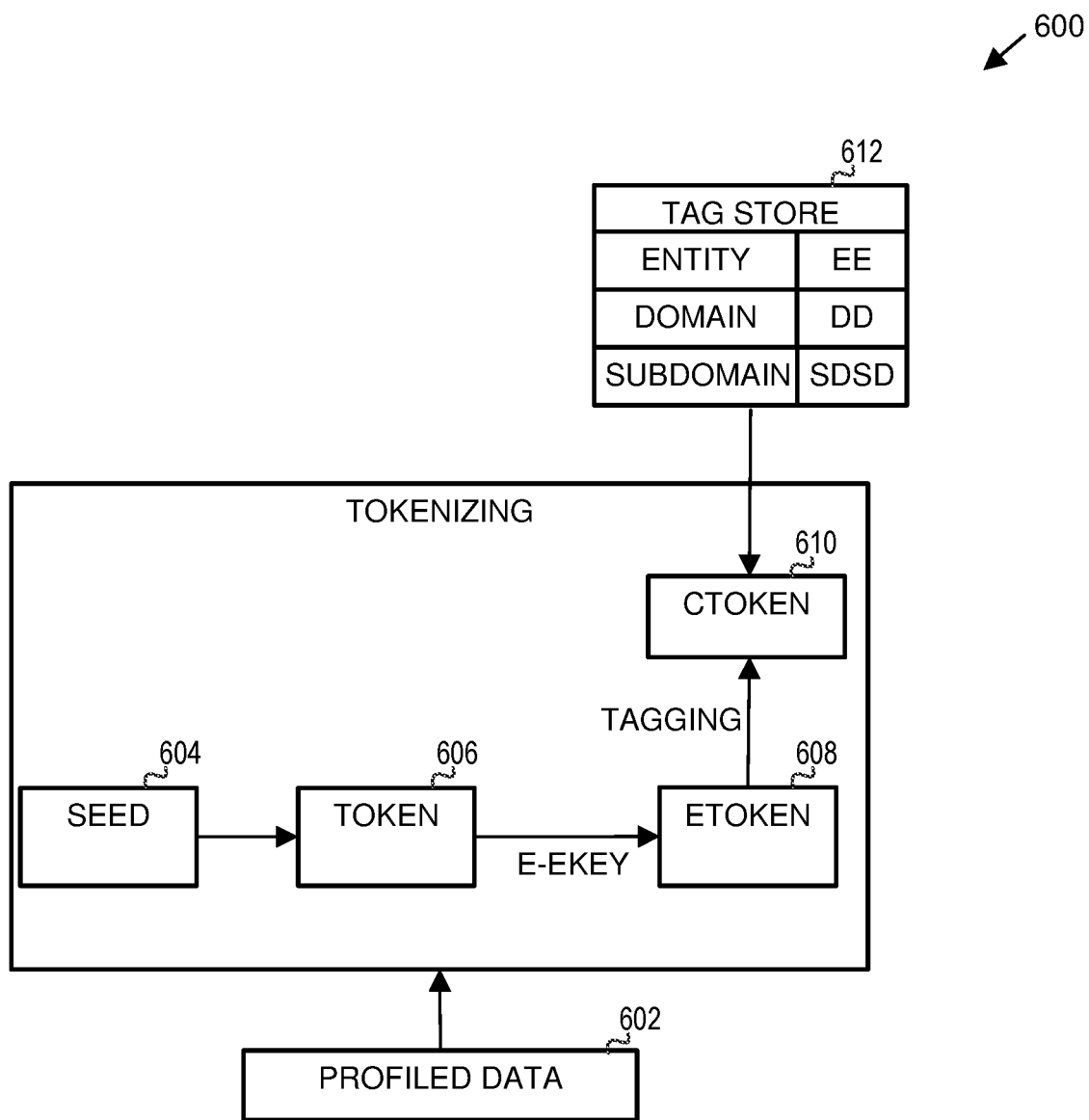
FIG. 6 is a block diagram illustrating an example tokenizing process.

FIG. 6 is a block diagram 600 illustrating an example tokenizing process. The tokenizing process can include obtaining profiled data 602 that includes data processed in the data masking process as described herein. The profiled data can be hashed using a hash code generator (e.g., SALT 604). The hash code generator can be called at runtime. The hash salt can be used in hashing the data using a NIST standard cryptographic hash functions such as, Secure Hash Algorithms (SHA 512/256). Hashing the data can generate a tokenized version of the data 606. For example, hashed data can include a 64-character token. The token 606 can be further compressed into a 44-character string using an encoding technique (e.g., Base64 encoding).

In some embodiments, the token 606 can be encrypted using a client-specific encryption key (e.g., E-EKEY) to produce an intermediate encrypted token (e.g., ETOKEN 608). This may provide an additional layer of encryption and security of the client data to further mitigate risks of unauthorized access to the client data.

The token 606 (or, in some cases, the encrypted token 608) can be tagged with metadata to generate a contextualized token 610. In some embodiments, the contextualized token 610 can be tagged with client-specific tags to generate a client-specific contextualized token (e.g., CTOKEN 610). The contextualized token 610 can be generated based on information maintained in a tag store 612.

In some embodiments, the contextualized token 610 can be generated using any of an encryption process and/or a contextualization process. An encryption process can include encrypting the tokenized information using encryption information specific to the client. The contextualization process can include adding context information for the client to the tokenized information. The context information can be either client-specific or utilized across multiple clients.

The tag store 612 can include a series of tags that correspond to various classification types. For example, tag store 612 can maintain an entity classification tag (EE), a domain classification (DD), and a subdomain classification (SDSD). In some cases, the tags can have a length of up to eight characters. The tag store 612 can maintain a unique tagging scheme for each client. The tag store 612 can include encrypted information that is associated with an encryption key. The information included in the tag store 612 can be provided when tagging tokenized data to generate contextualized tokens. The tag store 612 can be securely maintained by network-accessible server system and access to the tag store can be only provided to authorized users.

The contextualized token 610 can be maintained at a network-accessible server system configured to maintain contextualized tokens 610 for the client and generate insights into the data. In some cases, the tokens can be sent from the remote node to a network-accessible server system for data matching and insight generation.

Example Method for Implementing a Data Masking Process

Figure 7:
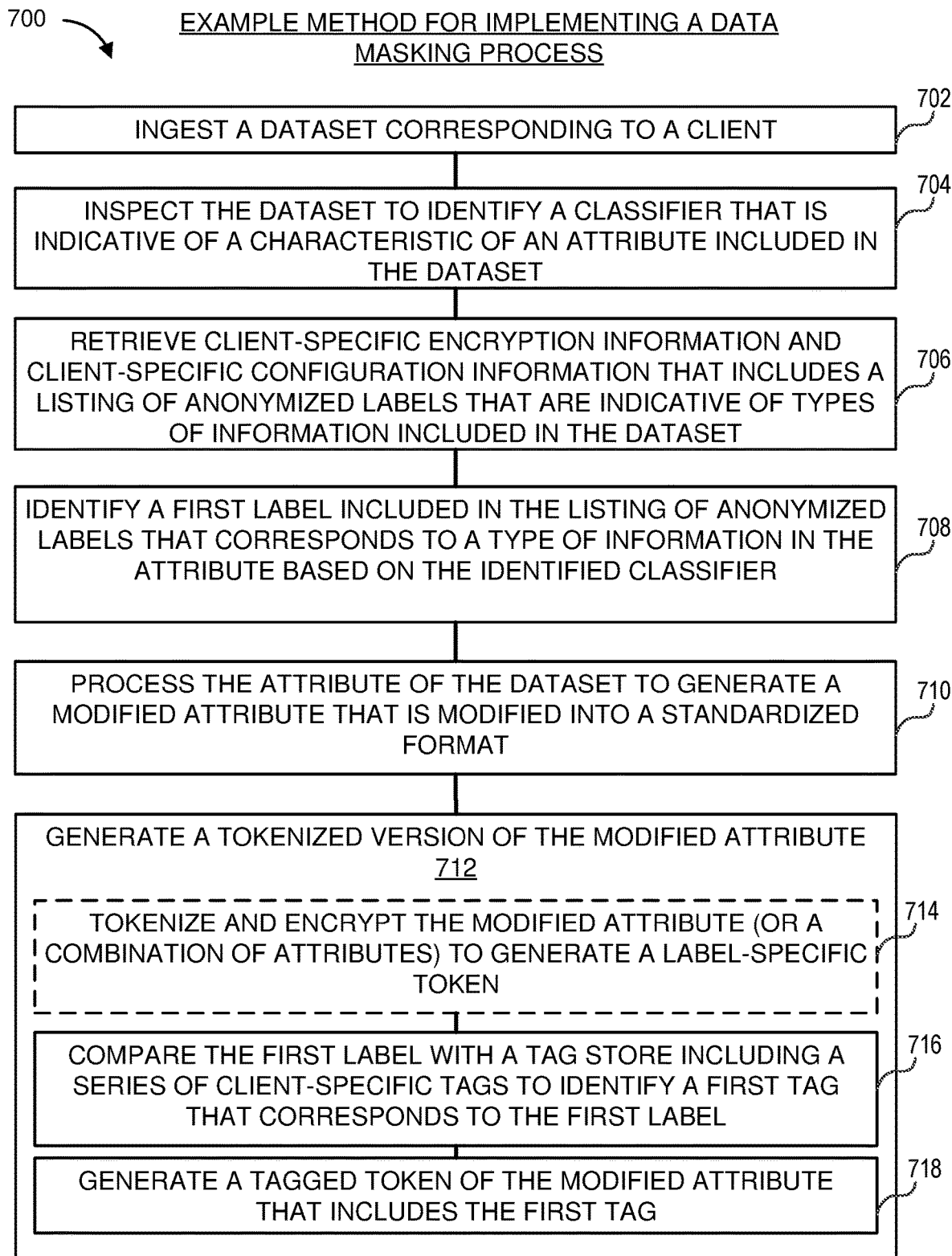
FIG. 7 is a block diagram of an example method for securely classifying and tokenizing data in a data masking process.

FIG. 7 is a block diagram of an example method 700 for securely classifying and tokenizing data in a data masking process. As shown in FIG. 7, the method may include ingesting a dataset corresponding to a client (block 702). The dataset may include a series of columns of data relating to a client. This information can be maintained at a client node. In some cases, at least a portion of the data included in the dataset includes personally identifiable information (PII).

The method may include inspecting the dataset to identify a classifier that is indicative of a characteristic of an attribute included in the dataset (block 704). In some embodiments, the classifier includes any of a domain classifier, a subdomain classifier, an attribute classifier, and an entity classifier. In some cases, each classifier can be determined based on inspecting the dataset.

The method may include retrieving client-specific encryption information and client-specific configuration information that includes a listing of anonymized labels that are indicative of types of information included in the dataset (block 706). In some embodiments, the client-specific encryption information may be retrieved from a secure server, the client-specific encryption information can be encrypted using a hashed message authentication code (HMAC) protocol, and wherein the hash code can include a computer-generated SHA2 512/256 token.

The method may include identifying a label included in the listing of anonymized labels that corresponds to a type of information in the attribute based on the identified classifier; (block 708). A label can provide an anonymized identifier of a type of information represented in the attribute. The label can be generated based on any of the attribute and the classifier. For example, if an attribute relates to a name, the corresponding label can be "La1." In these embodiments, only entities with access to a listing of the information corresponding to the labels can identify the type of information identified by each label, thereby anonymizing the data.

The method may include processing the attribute of the dataset to generate a modified attribute that is modified into a standardized format (block 710). This can include the profiling process as described herein.

In some embodiments, processing the attribute of the dataset to generate the modified attribute further comprises retrieving a set of validation rules and a set of standardization rules that correspond to the label. The set of validation rules can provide rules indicative of whether the attribute corresponds to the label. The set of standardization rules can provide rules to modify the attribute into the standardized format. The attribute can be compared with the set of validation rules to determine whether the attribute corresponds to the label. The attribute can be modified into the standardized format according to the set of standardization rules responsive to determining that the attribute corresponds to the label.

In some embodiments, processing the attribute of the dataset to generate the modified attribute further comprises processing the attribute using a series of rules engines. The rules engines can include a name engine that associates the attribute with commonly associated names included in a listing of associated names, responsive to determining that the attribute is indicative of a name. The rules engines can also include an address library engine that adds the attribute to a library of addresses associated with the client, responsive to determining that the attribute is indicative of an address.

The method may include generating a tokenized version of the modified attribute (block 712). Generating the tokenized version of the modified attribute can include tokenizing and encrypting the modified attribute (or a combination of attributes) to generate a label-specific token (block 714). This may include hashing the modified attribute using a hash code included in the client-specific encryption information to generate a hashed modified attribute. The hashed modified attribute can be compressed from a 64-character token to a 44-character string using an encoding scheme.

Generating the tokenized version of the modified attribute can also include comparing the label with a tag store including a series of client-specific tags to identify a first tag that corresponds to the label (block 716). Generating the tokenized version of the modified attribute can also include generating a contextualized token of the modified attribute that includes the first tag (block 718).

In some embodiments, the tokenized version of the modified attribute can be sent from a remote node to a network-accessible server system.

In some embodiments, responsive to identifying the label, the method may include generating a first set of insights of the dataset based on the label and the attribute. Responsive to generating the modified attribute, the methods may also include generating a second set of insights for the dataset based on the modified attribute. The first set of insights and second set of insights can be stored in a network-accessible server system.

Example Processing System

Figure 8:
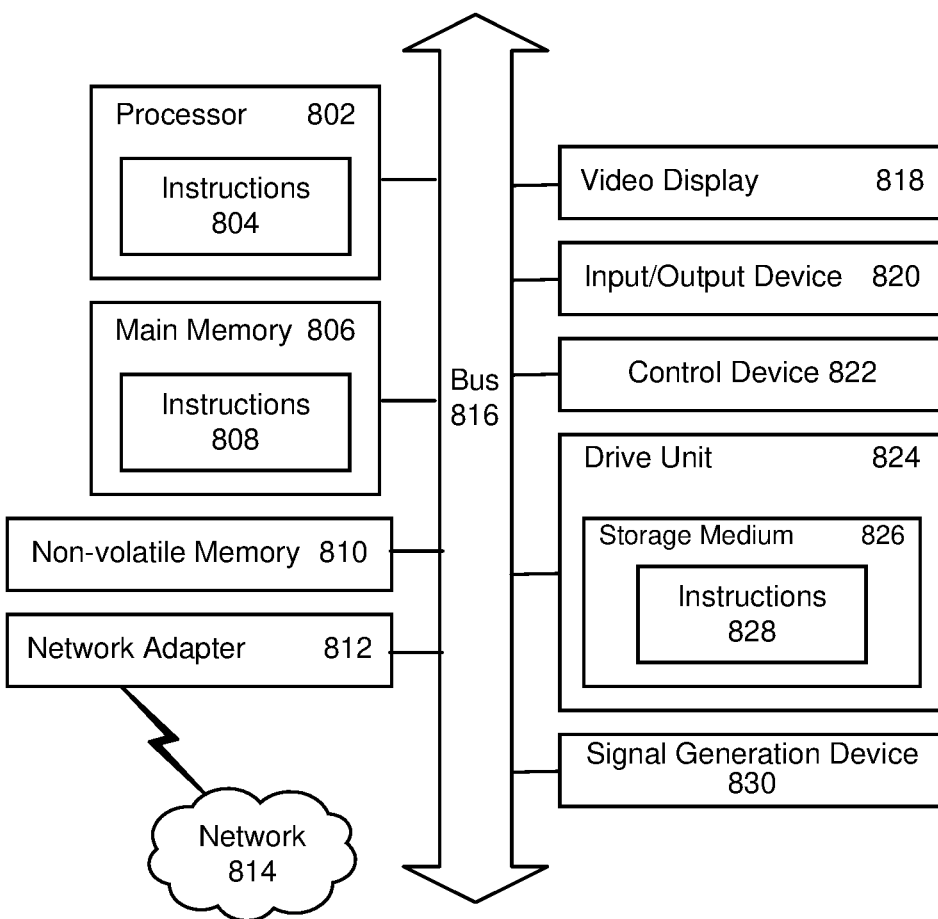
FIG. 8 is a block diagram that illustrates an example of a processing system in which at least some operations described herein can be implemented.

FIG. 8 is a block diagram illustrating an example of a processing system 800 in which at least some operations described herein can be implemented. As shown in FIG. 8, the processing system 800 may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 800 operates as part of a user device, although the processing system 800 may also be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 800.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method for securely classifying and tokenizing data, the method comprising:
    ingesting a dataset corresponding to a client;
    inspecting the dataset to identify a classifier that is indicative of a characteristic of an attribute included in the dataset;
    retrieving client-specific encryption information and client-specific configuration information that includes a listing of anonymized labels that are indicative of types of information included in the dataset;
    identifying a label included in the listing of anonymized labels that corresponds to a type of information in the attribute based on the identified classifier;
    responsive to determining that the attribute corresponds to the label, processing the attribute of the dataset to generate a modified attribute that is modified into a standardized format according to a set of standardization rules; and
    generating a tokenized version of the modified attribute, including:
        hashing the modified attribute using a hash salt and encryption key included in the client-specific encryption information to generate a hashed modified attribute;
        comparing the label with a tag store including a series of client-specific tags to identify a first tag that corresponds to the label; and
        generating a contextualized token of the modified attribute that includes the first tag;
    wherein processing the attribute of the dataset to generate the modified attribute further comprises:
    retrieving a set of validation rules and the set of standardization rules that correspond to the attribute, the set of validation rules providing rules indicative of whether the attribute corresponds to the label, and the set of standardization rules providing rules to modify the attribute into the standardized format; and
    comparing the attribute with the set of validation rules to determine whether the attribute corresponds to the label.

2. The computer-implemented method of claim 1, wherein at least a portion of the data included in the dataset includes personally identifiable information (PII).

3. The computer-implemented method of claim 1, wherein the classifier includes any of a domain classifier, a subdomain classifier, an attribute classifier, and an entity classifier.

4. The computer-implemented method of claim 1, wherein the client-specific encryption information is retrieved from a secure server, the client-specific encryption information encrypted using a hashed message authentication code (HMAC) protocol or transmitted via TLS protocol, and wherein the hash salt includes a computer-generated SHA2 512/256 token, and AES256 encryption key.

5. The computer-implemented method of claim 1, wherein processing the attribute of the dataset to generate the modified attribute further comprises applying a name engine that associates the attribute with commonly associated names included in a listing of associated names and an address library engine that adds the attribute to a library of addresses associated with the client.

6. The computer-implemented method of claim 1, further comprising:
    encrypting the hashed modified attribute using a client-specific encryption key included in the client-specific encryption information.

7. The computer-implemented method of claim 1, further comprising:
    responsive to identifying the label, generating a first set of insights of the dataset based on the label and the attribute;
    responsive to generating the modified attribute, generating a second set of insights for the dataset based on the modified attribute; and
    storing the first set of insights and the second set of insights in a network-accessible server system.

8. A method performed by a computing node to generate a tokenized impression of client data, the method comprising:
    obtaining a stream of data corresponding to a client from a client node, the stream of data including a series of datasets;
    for each dataset included in the stream of data:
        inspecting the dataset to identify a classifier that is indicative of a characteristic of an attribute included in the dataset;
        identifying a label included in a listing of client-specific labels that corresponds to the dataset;
        responsive to determining that the attribute corresponds to the label, processing the attribute to generate a modified attribute that is modified into a standardized format according to a series of rules engines; and
        generating a token that includes a tokenized version of the modified attribute; and
    sending generated tokens for the stream of data to a network-accessible server system configured to maintain the generated tokens;
    wherein processing the attribute using the series of rules engines further comprises:
    retrieving a set of validation rules and the set of standardization rules that correspond to the label, the set of validation rules providing rules indicative of whether the attribute corresponds to the label, and the set of standardization rules providing rules to modify the attribute into the standardized format; and
    comparing the attribute with the set of validation rules to determine whether the attribute corresponds to the label.

9. The method of claim 8, further comprising:
retrieving client-specific encryption information that includes a hash code and a client-specific encryption key from a secure server; and
retrieving client-specific configuration information that includes the listing of client-specific labels that are indicative of types of information included in the dataset, wherein each label is configured to anonymize information relating to the stream of data such that identifying information relating to the stream of data using the label is only discernable using the client-specific configuration information.

10. The method of claim 9, wherein said generating the tokenized version of the modified attribute includes:
hashing the modified attribute using the hash code included in the client-specific encryption information to generate a hashed modified attribute;
comparing the classifier with a tag store including a series of client-specific tags to identify a first tag that corresponds to the classifier; and
generating a contextualized token of the modified attribute that includes the first tag, the token including the contextualized token.

11. The method of claim 9, further comprising:
encrypting the modified attribute using the client-specific encryption key included in the client-specific encryption information.

12. The method of claim 8, wherein said identifying the classifier further includes:
determining a domain classifier from a listing of domain classifiers, each domain classifier indicative of a type of information included in the dataset;
determining a subdomain classifier from a listing of subdomain classifiers, each subdomain classifier indicative of a subset of the selected information type identified in the domain classifier;
determining an attribute classifier from a listing of attribute classifiers, each attribute classifier indicative of a type of identifiable information included in the dataset; and
determining an entity classifier from a listing of entity classifiers, each entity classifier indicative of a division of an organization associated with the client.

13. A tangible, non-transitory computer-readable medium having instructions stored thereon that, when executed by a processor, cause the processor to:
ingest a dataset corresponding to a client;
identify a classifier that is indicative of a characteristic of an attribute included in the dataset;
retrieve client-specific encryption information and client-specific configuration information that includes a listing of anonymized labels that are indicative of types of information included in the dataset;
identify a label included in the listing of anonymized labels that corresponds to a type of information included in the attribute based on the identified classifier;
responsive to determining that the attribute corresponds to the label, modify the attribute of the dataset to generate a modified attribute into a standardized format according to a set of standardization rules; and
generate a tokenized version of the modified attribute, including:
hash the modified attribute using a hash code included in the client-specific encryption information to generate a hashed modified attribute;
compare the label with a tag store including a series of client-specific tags to identify a first tag that corresponds to the label; and
generate a contextualized token of the modified attribute that includes the first tag:
wherein said process the attribute of the dataset to generate the modified attribute further comprises:
retrieving a set of validation rules and the set of standardization rules that correspond to the label, the set of validation rules providing rules indicative of whether the attribute corresponds to the label, and the set of standardization rules providing rules to modify the attribute into the standardized format; and
comparing the attribute with the set of validation rules to determine whether the attribute corresponds to the label.

14. The computer-readable medium of claim 13, wherein the attribute includes an impression of data included in the dataset while preventing transmission of the dataset from a client node maintaining the dataset.

15. The computer-readable medium of claim 13, wherein the classifier includes any of a domain classifier indicative of a type of information included in the dataset, a subdomain classifier indicative of a subset of the selected information type identified in the domain classifier, an attribute classifier indicative of a type of identifiable information included in the dataset, and an entity classifier indicative of a division of an organization associated with the client.

16. The computer-readable medium of claim 13, wherein the client-specific encryption information is retrieved from a secure server, the client-specific encryption information is encrypted using a hashed message authentication code (HMAC) protocol, and wherein the hash code includes a computer-generated SHA2 512/256 token.

17. The computer-readable medium of claim 13, further causing the processor to: encrypt the hashed modified attribute using a client-specific encryption key included in the client-specific encryption information.

* * * * *

UNITED STATES PATENT AND TRADEMARK OFFICE
CERTIFICATE OF CORRECTION

PATENT NO. : 11,704,438 B2
APPLICATION NO. : 17/845848
DATED : July 18, 2023
INVENTOR(S) : Satyender Goel et al.

It is certified that error appears in the above-identified patent and that said Letters Patent is hereby corrected as shown below:

In the Claims

In Claim 8, Column 16, Line 58, delete "the" and insert --a--.

Signed and Sealed this
Nineteenth Day of September, 2023

Katherine Kelly Vidal
*Director of the United States Patent and Trademark Office*